United States Patent [19]
Kjellberg et al.

[11] Patent Number: 5,123,448
[45] Date of Patent: Jun. 23, 1992

[54] VALVE ARRANGEMENT

[75] Inventors: Kenneth Kjellberg, Skövde; Åke Jonsson, Väring, both of Sweden

[73] Assignee: Bo Erik Nyberg, Oberageri, Switzerland

[21] Appl. No.: 720,775
[22] PCT Filed: Jan. 15, 1990
[86] PCT No.: PCT/SE90/00028
    § 371 Date: Jul. 16, 1991
    § 102(e) Date: Jul. 16, 1991
[87] PCT Pub. No.: WO90/08284
    PCT Pub. Date: Jul. 26, 1990

[30] Foreign Application Priority Data

Jan. 19, 1989 [SE] Sweden ............... 8900188

[51] Int. Cl.⁵ ............... F16L 29/00; F16K 39/04
[52] U.S. Cl. ............... 137/614.03; 251/149.6; 251/321; 251/900
[58] Field of Search ............... 251/149.1, 149.3, 149.6, 251/149.9, 321, 900; 137/614.03, 614.04, 614.05, 614.02, 614.01, 614

[56] References Cited

U.S. PATENT DOCUMENTS

| | | | |
|---|---|---|---|
| 2,753,195 | 7/1956 | Palmer | 137/614.03 X |
| 3,446,245 | 5/1969 | Snyder, Jr. | 137/614.03 |
| 3,464,436 | 9/1969 | Bruning | 137/614.03 X |
| 3,715,099 | 2/1973 | Shendure | 251/149.1 |
| 4,086,939 | 5/1978 | Wilcox et al. | 251/149.6 X |
| 4,134,573 | 1/1979 | Messinger | 251/900 X |
| 4,249,572 | 2/1981 | Shindelar et al. | 251/149.6 X |
| 4,865,292 | 9/1989 | Ekman | 251/149.6 |

FOREIGN PATENT DOCUMENTS

0034312 8/1981 European Pat. Off. .
428721 7/1983 Sweden .

Primary Examiner—Martin P. Schwadron
Assistant Examiner—Kevin L. Lee
Attorney, Agent, or Firm—Young & Thompson

[57] ABSTRACT

A valve arrangement for a pressure fluid, particularly high-pressure oil, has a valve housing (10, 90, 190) with an internal, cylindrical sealing surface (16, 100, 160) which forms a guide for the outer, cylindrical sealing surface (42, 107, 162) of a piston body (18, 106, 138). There is provided a circular groove which accommodates a sealing ring (46, 64, 108, 164). An axially displaceable valve sleeve (30, 70, 122, 156) is disposed coaxially with the two cylindrical sealing surfaces (16, 42, 100, 107, 162, 160) and has a cylindrical valve-sealing surface (40, 74, 124, 158). This valve sleeve is biased by a spring (34, 80, 118, 172) such that one end (36, 82, 126, 174) abuts substantially sealingly a seating (38, 86, 128, 176) at that end of the sealing surface such as to form a closed gap (41, 86, 130, 178) at one end of a channel (32, 73, 132, 145). The valve housing (10, 90, 190) is displaceable axially from a starting position relative to the piston body (18, 106, 138) to an intermediate position in which the sealing ring (46, 64, 108, 164) has been moved from a position on one side of the closed (41, 86, 130, 178) to a position on the other side of the closed gap.

4 Claims, 5 Drawing Sheets

VALVE ARRANGEMENT

The present invention relates to a valve arrangement intended for pressure fluids, such as high-pressure oil, and being of the kind set forth in the preamble of the following claim 1.

Such valve arrangements are incorporated, inter alia, in quick-couplings of the kind which comprise a male part which can be pushed into a female part, so as to connect together two conduits or passageways. The valve arrangement may also be included in a hydraulic valve operative to open and close the connection between two conduits or passageways.

The valve arrangements include an elastic or resilient sealing ring which is fitted in a circular groove and which is subject to the effect of high-pressure fluid on one side thereof. The valve arrangement may also include a further sealing ring, which may be subject to the effect of high-pressure fluid, low-pressure fluid or atmospheric pressure on the other side thereof. By high-pressure fluid is normally meant high-pressure oil having a pressure of at least 10 bars and in those cases to which the invention pertains generally a pressure of at least some hundred bars.

When such a valve is opened, the high-pressure fluid will flow through the valve in an explosive, violent fashion for a short period of time and will strike the elastic sealing ring in such a manner that the ring would be torn from its groove unless precautionary measures are taken to prevent this from happening. These precautionary measures normally involve the incorporation of a solenoid valve in the conduit upstream of the valve arrangement, this solenoid valve being kept closed when the valve arrangement is adjusted from a closed to an open valve-setting and the sealing ring is moved through the risk zone. Only then is the solenoid valve opened, so as to allow the high-pressure oil, or other high-pressure fluid, to pass through the valve without damaging the sealing ring. The provision of the solenoid valve, or any other kind of closing valve, however, adds to the manufacturing costs and complicates manipulation of the valve arrangement. Furthermore, the presence of the additional closing valve considerably prolongs the time taken to open the valve arrangement.

Consequently, an object of the present invention is to provide a valve arrangement of the aforesaid kind which can be opened without the aid of additional closing valves.

The invention is intended primarily to improve quick-couplings intended for connecting a pressure-oil source having a pressure of several hundred bars to a hydraulic tool, and then particularly to quick-couplings of the kind in which a number of male coupling-parts are attached to a carrier plate which can be moved hydraulically, backwards and forwards in relation to stationarily mounted female coupling-parts intended to receive respective male parts upon forward coupling-movement of the carrier plate. In these instances it is unnecessary to provide the female coupling-parts with locking sleeves which coacts with balls such as to lock the male part to the female part when coupling the two parts manually together at a relatively low pressure in a conventional manner. However, the invention is also intended for application in quick-couplings where the fluid pressure is sufficiently low to enable the male and female parts to be coupled manually, such as in the case of various types of hydraulic tools which operate at a hydraulic pressure of about 10 bars or less.

The improved, inventive valve arrangement of the aforesaid kind has the characteristic features set forth in the characterizing clause of the following claim 1.

Thus, the elastic sealing ring is protected by an axially displaceable valve sleeve which holds the throughflow passageway closed until the sealing ring has been moved to a safe position, whereafter displacement of the valve sleeve opens the throughflow passageway.

These and other details and advantages significant of the invention are described below in more detail with reference to a number of exemplifying embodiments of an inventive valve arrangement illustrated in the accompanying drawings.

Figure 1:
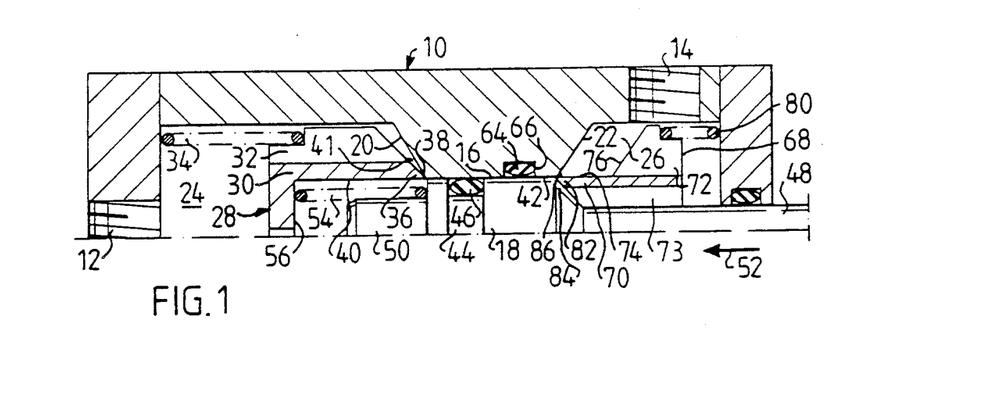
FIGS. 1 to 3 are mutually similar axial-sectional views of a hydraulic closing valve which incorporates an inventive valve arrangement, and show respectively the valve in a closed position, an intermediate position and an open position.
Figure 2:
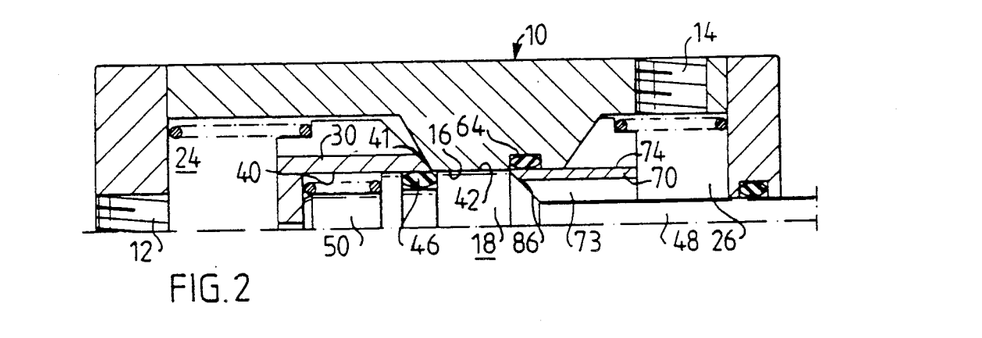
Figure 3:
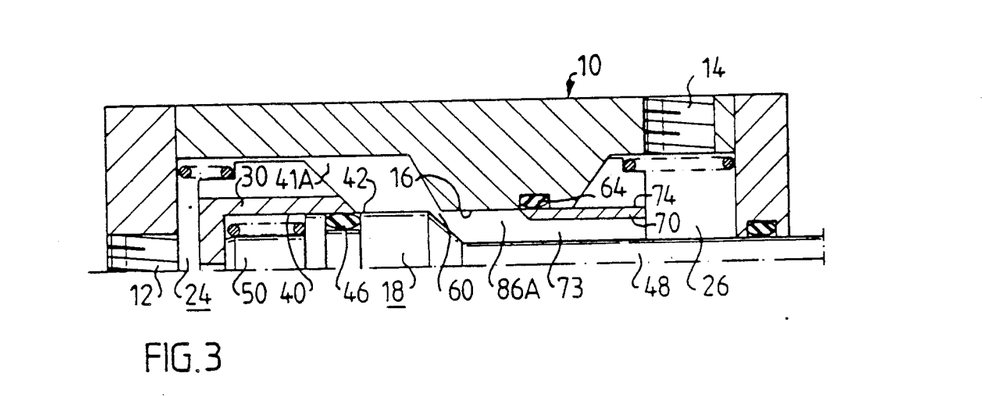

The simplest embodiment of the inventive valve arrangement is illustrated in conjunction with the hydraulic valve illustrated in FIGS. 1–3, this valve having two inventive valve arrangements.

The hydraulic valve illustrated in FIG. 1 includes a valve housing 10 in which there is included a passage through which oil under high pressure can flow when the valve arrangements are open. The ends of the passage are provided with respective connections 12 and 14 for connection to conduits not shown.

Along part of its length, the passage is configured to present an internal, cylindrical sealing surface, such as to form a cylinder 16. A piston body 18 is mounted for axial movement in said cylinder.

The hydraulic valve of the illustrated embodiment includes two inventive valve arrangements which enable high-pressure oil to be connected alternatively to the connection 12 or the connection 14.

The respective ends of the cylinder 16 adjoin two widened passage-parts which have conical end surfaces 20 and 22 and each of which forms a respective pressure chamber 24 and 26.

A valve body 28 having a valve sleeve 30 and axially extending channels 32 is mounted for axial movement in the chamber 24. The valve body is biased towards the end surface 20 by a stronger compression spring 34, a conical end 36 of the valve sleeve being in abutment with a seating 38 located at the inwardly located part of the end surface 20. The contact between said end of the valve sleeve and said seating is a metal-on-metal contact and forms a corresponding seal with a given minimum leakage.

The seating and the valve sleeve may have mutually the same conicity, although in the case of the illustrated embodiment the seating and valve sleeve have mutually different conicities, such as to obtain a small abutment surface which lies in the proximity of the sealing surface 40, thereby decreasing the hydraulic forces which counteract opening of the valve sleeve. This embodiment is intended for extremely high pressures in the chamber 24. The inner surface of the valve sleeve 30 forms an internal, cylindrical sealing surface 40 which is an interrupted extension of the cylindrical sealing surface of the cylinder 16.

Defined between the conical end 36 and the seating 38 is a gap which is closed in the illustrations of FIGS. 1 and 2, and is referenced 41 in this closed state. The gap is referenced 41A in its open state or position, shown in FIG. 3. The external, cylindrical sealing surface 42 of the piston body 18 has provided therein a circular groove 44 which accommodates a substantially elastic sealing ring 46 which in FIG. 1 abuts the internal, cylindrical sealing surface 16 in a manner to provide an effective seal and prevent leakage past the sealing ring.

The piston body 18 is manouvered by means of a piston rod 48 attached to one end of the piston body. The other end of the piston body is extended with a pin 50. When the piston body is displaced in the direction of the arrow 52 relative to the valve housing and the valve sleeve 30 moves to the intermediate position in FIG. 2 against the action of a weaker compression spring 54, the pin 50 will move into contact with the bottom 56 of the valve sleeve, as shown in the intermediate position of FIG. 2.

In this intermediate position, the piston body with the sealing ring 46 has been moved from its starting position, shown in FIG. 1, and has passed through a first region on one side of the closed gap 41 between the end 36 of the valve sleeve and the seating 38, and through a second region to its position on the opposite side of the gap shown in FIG. 2. During this travel of the piston body past the closed gap, the sealing ring is protected by the cylindrical surface 16 up to the gap, and thereafter by the sealing surface 14 of the valve sleeve.

During continued movement of the piston body from the intermediate position shown in FIG. 2 to the open end position shown in FIG. 3, i.e. when the piston body is displaced into a third region, the pin 50 abuts the bottom 56 of the valve sleeve and moves said valve sleeve, together with the piston body, to the end position shown in FIG. 3, where the piston body lies outside the end of the cylindrical sealing surface 16 and the gap 41 is opened to form an open gap 41A (FIG. 3), which includes a through-flow gap 60, where the explosive, instantaneous through-flow of high-pressure oil takes place. The sealing ring 46, however, is well protected at a distance from this gap 60.

The inventive valve arrangement enables the valve to open immediately at a pressure of several hundred bars in the chamber 24, without risk of damaging the sealing ring 34.

The valve arrangement is closed in the reverse order, from the position shown in FIG. 3 to the position shown in FIG. 1, the sealing ring 46 being protected by the valve sleeve until the gap is closed and forms the closed gap 41 (FIG. 2). It is only then that the sealing ring 46 is moved past the closed gap 41 to its starting position, shown in FIG. 1.

When high pressure prevails solely in the chamber 24, and thus not in the chamber 26, with the valve arrangement closed, it suffices to provide the aforedescribed valve arrangement with only one single valve sleeve 28, with its associated functions, without taking further protective measures. It is often necessary, however, to be able to alternate the high-pressure side, so that high pressure will prevail in the chamber 26 but not in the chamber 24.

In order to provide for this alternative, a further sealing ring 64 made of a substantially elastic material is disposed in a circular groove 66 formed in the internal, cylindrical sealing surface 16 such as to seal against the outer cylindrical sealing surface 42 of the piston body 18.

A valve body 68 which includes a valve sleeve 70 and axially extending channels 72 is mounted for axial movement in the chamber 26. The outer, cylindrical sealing surface 74 of the valve sleeve forms an interrupted extension of the internal, cylindrical sealing surface 16. A channel 73 which terminates at the closed gap 73 is located between the sleeve 70 and the piston rod 48.

The valve body 68 has a conical end surface 76 which is intended to abut the conical end surface 22 of the chamber when the piston body 18, together with the valve body 68, is displaced to the intermediate position shown in FIG. 2. During this displacement, the valve body is biased by a compression spring 80, such that the end 82 of the valve sleeve 70 will abut a seating 84 on an adjacent conical end of the piston body 18, thereby to form a closed gap (FIGS. 1 and 2) between the end 82 of the valve sleeve and the seating 84 of the piston body.

When the piston body 18 is then moved from the intermediate position shown in FIG. 2 to the open end position shown in FIG. 3, the valve body 68 with the valve sleeve 70 will remain in abutment with the end surface 22, so that the gap 86 is opened to form an open circular gap 86A (FIG. 3), the end part of which is formed by the through-flow gap 60. The sealing ring 64 is now located at a safe distance from the open gap 60 and is protected effectively by the valve sleeve 70 when high-pressure oil flow through the gap 60.

Figure 4:
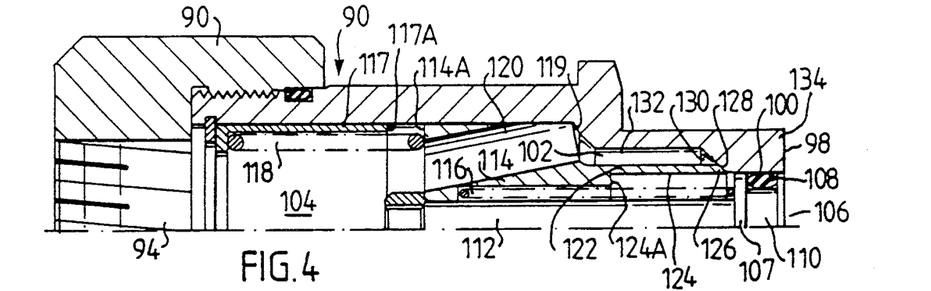
FIG. 4 is an axial sectional view of the male part of a quick-coupling incorporating an inventive valve arrangement and shows the valve in its closed position.
Figure 5:
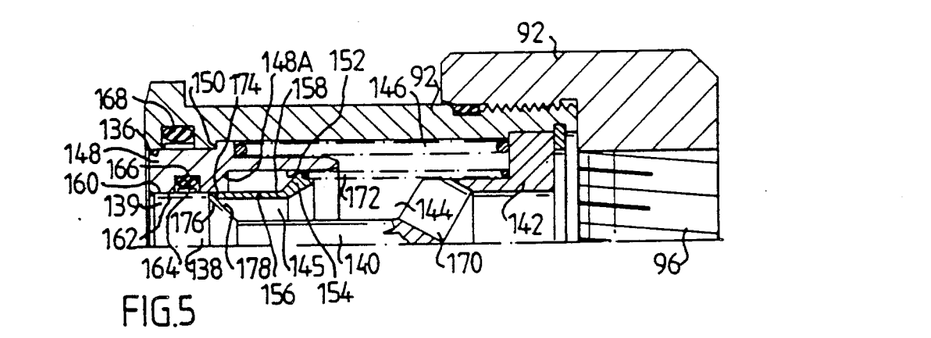
FIG. 5 is an axial sectional view of the female part of a quick-coupling incorporating an inventive valve arrangement, and shows the valve arrangement in its closed position, the illustrated female part being able to receive the male part shown in FIG. 4.

FIGS. 4 and 5 illustrate respectively valve housings with mutually different configurations of the inventive valve arrangement. The valve housing 90 in FIG. 4 forms a male part which can be inserted into a female part formed by the valve housing 92 shown in FIG. 5. The male and female parts form the quick-coupling 93 illustrated in FIGS. 6 to 8.

The valve housing 90 has a connection 94 for connection to a conduit for high-pressure oil, and the valve housing 92 has a connection 96 for connection to a conduit for high-pressure oil. In practice, only one or the other of said connections will normally be connected to receive high-pressure oil, namely oil having a pressure of several hundred bars.

The male part or valve housing 90 can be mounted on a displaceable carrier which is, for instance, manouvered hydraulically and advanced to a position in which a plurality of valve housings or female parts 92 are moved forwards one after the other in positions for connection with respective male parts. Alternatively, the carrier can support a plurality of male parts which can be coupled to a corresponding number of female parts mounted on a stationary carrier. The carrier holds the male and female parts in their mutually connected states, therewith obviating the necessity of providing latching means of the kind necessary when said parts are coupled together manually, e.g. in accordance with FIGS. 12-14.

The flow passage located between the connection 94 and the coupling end 98 of the valve housing 90 is configured along a part of its length as a cylinder or an internal, cylindrical part 100, which discharges at one end into the surrounding atmosphere and which is connected at its other end to a widened part 102, which in turn adjoins a cylindrical pressure chamber 104.

Mounted for axial movement in the cylinder 100 is a piston body 106. The piston has an outer, cylindrical sealing surface 107 in which there is formed a circular groove 110 which accommodates an elastic sealing ring 108. The piston body is carried by a piston rod 112 which is journalled in a valve body 114 for axial movement and which is held in the illustrated starting position by a weaker compression spring 116 mounted between a support surface 124A in the valve body 114 and the valve body 106.

The valve body 114 is, in turn, journalled for axial movement in the chamber 104 and is held in the illustrated starting position by a stronger compression spring 118, which biases the valve body into abutment with an abutment surface 119 at the end of the chamber 104. The spring 118 lies in a sleeve 117, one end of which forms a stop 117A for the end 114A of the valve body 114. The valve body includes a plurality of substantially axial channels 120, which connect the chamber 104 with the widened part 102.

The valve body is configured with a valve sleeve 122, the internal surface of which forms an internal, cylindrical sealing surface 124 which forms an interrupted extension of the internal, cylindrical sealing surface 100 of the cylinder 100.

In the illustrated position, the end 126 of the valve sleeve abuts a seating 128 at the beginning of the widened part 102, while forming a closed gap 130 with a given minimum leakage between the mutually abutting metal surfaces. In its open position shown in FIG. 4A, the gap is referenced 130A.

Formed between the valve sleeve 122 and the wall of the widened part 102 is an annular gap which forms a channel 132 connecting the channels 120 with the closed gap 130 and the open gap 130A respectively.

The valve housing, or the male part 90, has a cylindrical end-part 134 which can be inserted into a corresponding, internally cylindrical part 136 at the coupling end of the female part 92 of FIG. 5.

Provided in the female part 92 is a piston body 138 which includes an external, cylindrical sealing surface 139. The piston is attached to one end of a piston rod 140, which is carried by an end-piece 142 in the pressure chamber 144 of the female part. The end-piece is held in its end position by a stronger compression spring 146, the forwardly located end of which abuts a sealing sleeve 148, which, in turn, in a starting position abuts an abutment surface 150 in the chamber.

The sealing sleeve 148 has an internal, cylindrical sealing surface 152 against which a collar 154 guides and seals. The collar 154 is formed on the rear end of a valve sleeve 156, the outer surface of which forms an external, cylindrical sealing surface 158, which, in turn, forms an interrupted extension of the external, cylindrical sealing surface 160 of the piston body.

The piston body 138 is guided in the sealing sleeve 148, in an internal cylindrical part thereof which forms a sealing surface 162 at the forward end of the sealing sleeve. The piston body coacts with an elastic sealing ring 164 disposed in a circular groove 166 provided in the cylindrical sealing surface 162.

Also provided is an elastic sealing ring 168 which is accommodated in a groove provided in the forward, cylindrical part 136 of the chamber 144, for sealing against the sealing sleeve 148.

Figure 5A:
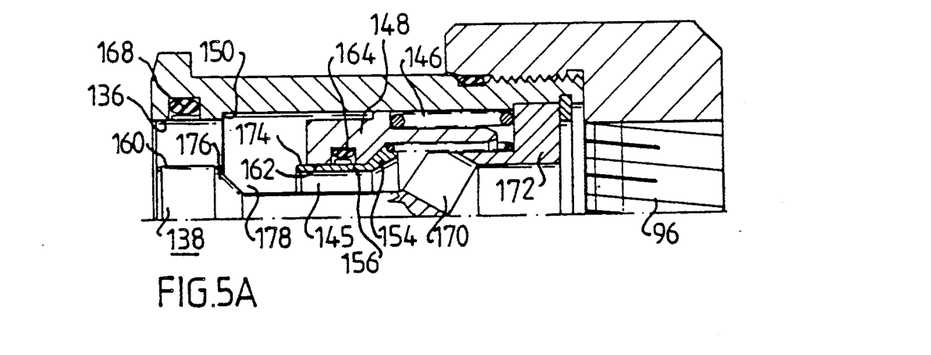
FIG. 5a shows the valve arrangement of FIG. 5 in its open position.

The end-piece 142 has provided therein axial channels 170 which connect the chamber 144 with the connection 96 and which are connected to the channel 145 disposed between the valve sleeve 156 and the piston rod 140 and extending up to the closed gap 178. The valve sleeve 156 is biased by a weaker spring 172, such that the forward end 174 of the valve sleeve abuts a seating 176 at the rear, conical end of the piston body. There is obtained between the end 174 and the seating 176 an openable gap which, in its closed position is referenced 178 in FIGS. 5, 6 and 7, and in its open position is referenced 178A in FIGS. 5A and 8 respectively.

Figure 6:
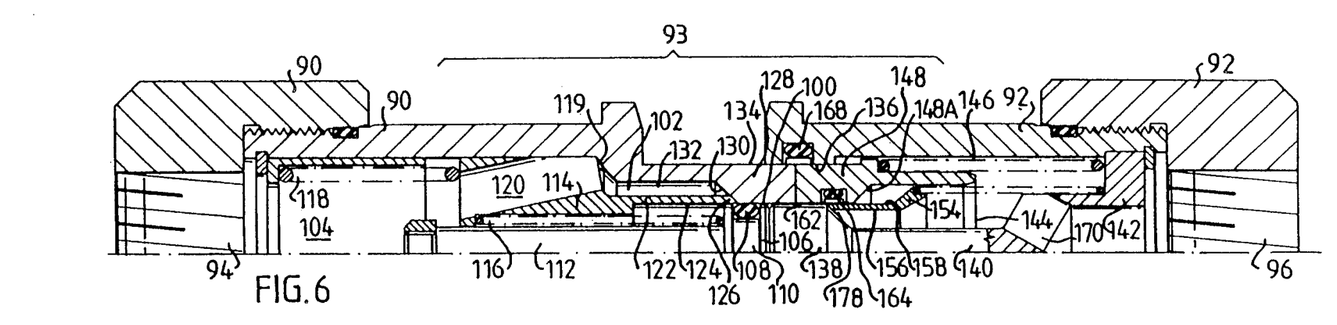
FIG. 6 illustrates the male part of FIG. 4 inserted partially in the female part of FIG. 5, such as to occupy an intermediate position in which the valve arrangements of the two coupling parts are still closed.
Figure 7:
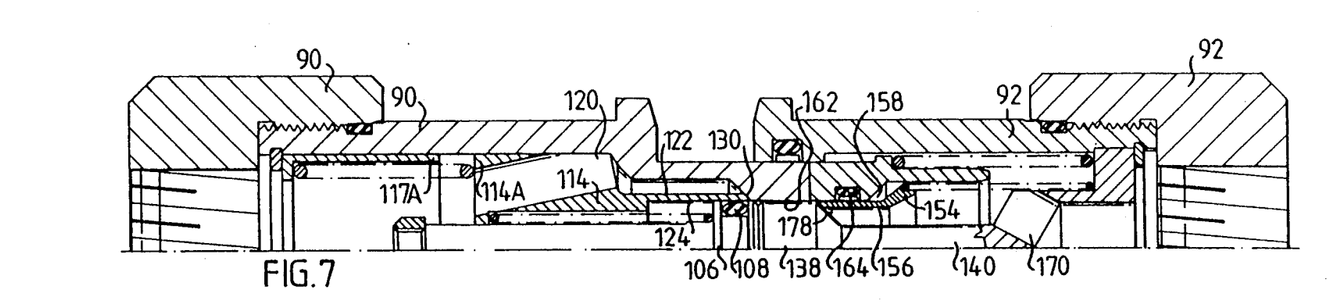
FIG. 7 illustrates a subsequent intermediate position in which the two sealing rings are still located in a position in which they are protected by respective valve sleeves, with the valve arrangements still closed.
Figure 8:
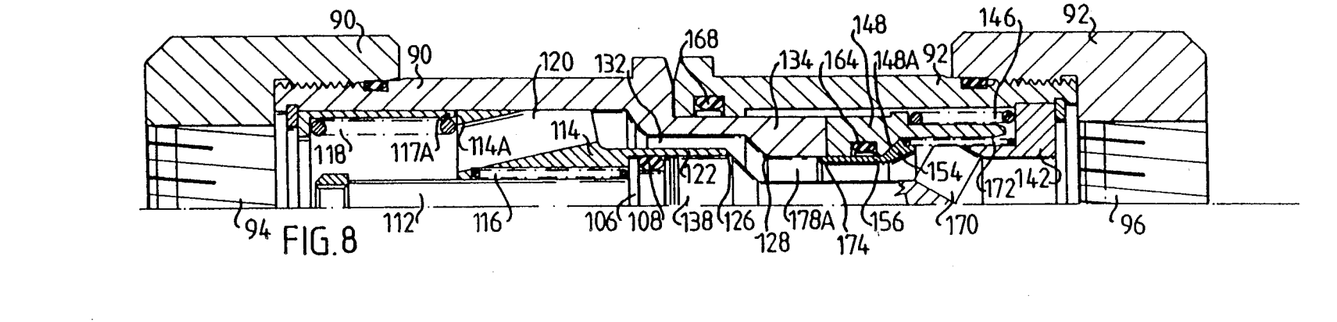
FIG. 8 illustrates the coupling of FIG. 7 in a fully coupled position, with both of the valve arrangements being fully open.

When the male part 90 is pressed against the female part 92, the piston body 132 of the female part remains in the illustrated position and forms a stop for the piston body 106 of the male part, the cylindrical end-part 134 of the male part being guided into the cylindrical part 136 of the female part while pushing back the sealing sleeve 148 in a known manner, as illustrated in FIGS. 6, 7 and 8.

The quick-coupling 93 illustrated in FIGS. 6 to 8 can be used when a high pressure prevails in the chamber 104 of the male part and/or the chamber 144 of the female part.

As described above, the sealing ring 108 is moved relative to the closed gap 130 in a first region on one side of the gap to the end of a second region on the other side of the gap, as illustrated in FIGS. 4, 6 and 7.

At the same time, the sealing ring 164 is moved relative to the closed gap 178 in FIGS. 5, 6 and 7, in a first region on one side of the gap to the end of a second region on the other side of the gap.

During the relative movement of the sealing rings 108 and 164 respectively through the first and the second regions, the sealing ring is protected effectively against the effect of the high-pressure oil in one or the other of said chambers.

It is not until the sealing rings have left the second region and enter a third region that opening of the two gaps commences, so as to form fully open gaps 130A and 178A respectively, these gaps merging with one another to form a flow passage for high-pressure oil in accordance with FIG. 8.

Figure 4A:
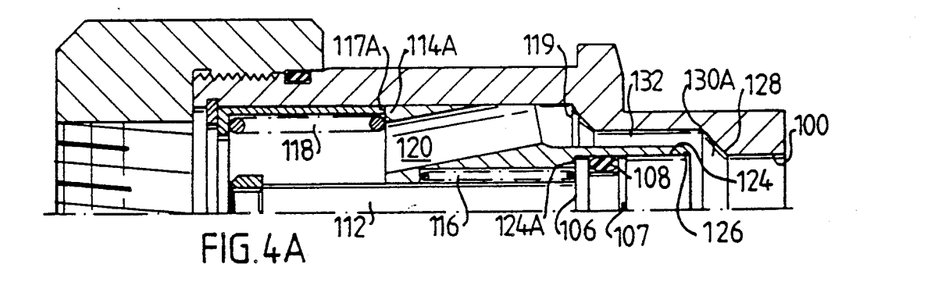
FIG. 4a shows the valve arrangement of FIG. 4 in its open position.

In the aforesaid third region, both of the sealing rings 108, 164 are moved to an end position, together with associated valve sleeves 122 and 156 respectively. In the illustration of FIGS. 4 and 4A, the piston body 106 engages an abutment 124A at the end of the cylindrical surface 124, when the sealing ring 108 reaches the end of said second region, whereafter the piston body entrains or dogs the valve body 114, with its valve sleeve 122, along a path which corresponds to the distance between the abutment 117A and the end 114A of the valve body, as seen in FIG. 4. This travel path from the position shown in FIG. 4A corresponds to the length of the third region.

Similarly, the sealing surface 148 has an abutment surface 148A (FIGS. 5 and 8) against which the collar 154 of the valve sleeve 156 abuts when the sealing ring 164 is brought, by relative displacement, to the end of its second region of movement. Continued movement will cause the sealing ring 164 to move in the third region, together with the valve sleeve 156, until the inner end of the sealing sleeve lies in the vicinity of the end-piece 142, as shown in FIG. 8.

Figure 9:
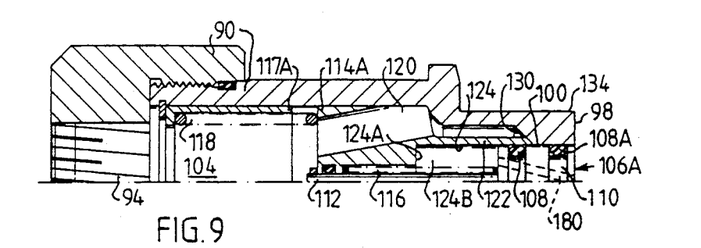
FIG. 9 illustrates a modified version of the male part shown in FIG. 4.
Figure 10:
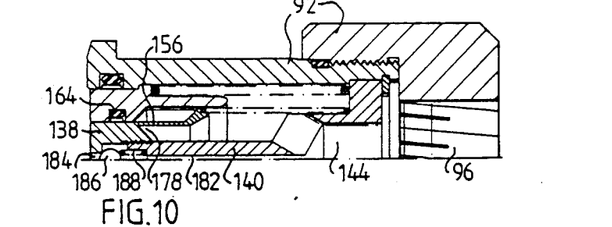
FIG. 10 illustrates a modified version of the female part shown in FIG. 5, this female part fitting into the male part shown in FIG. 10.

FIG. 9 illustrates a small modification of the valve housing 90, or the male part of FIG. 4, while FIG. 10 illustrates a corresponding small modification of the valve housing 92 or female part of FIG. 5. These modifications are intended to facilitate manual coupling of said parts when a relatively high residual-pressure remains in the male part, as can sometimes occur in the case of certain hydraulic tools or machines, such as excavating machines and other types of loading machine or machines. This residual pressure in the male part can offer some considerable resistance to manual coupling of the male part to the female part.

Those components of the embodiments shown in FIGS. 9 and 10 which correspond to the components shown in FIGS. 4 and 5 are identified by the same reference signs.

The male part is identified by the reference sign 90A and the female part by the reference sign 92B.

In FIG. 9, the piston body 106A is shown in its outer end position and can be moved axially in the cylindrical part 100 against the action of the spring 116. The piston body is provided with two circular grooves, each of which accommodates a respective resilient sealing ring 108 and 108A. The internal, cylindrical surface 124 of the valve body forms an impervious chamber 124B, which presents an abutment 124A at the bottom thereof, to form a stop for the piston body 106A in accordance with FIG. 11, which shows the male part coupled to the female part.

When the valve arrangement is in its closed position, as illustrated in FIG. 9, the sealing rings 108 and 108A seal against the small amount of oil which may possibly leak through the closed gap 130.

However, when pressing the piston body 106A into the valve sleeve 122, the sealing ring 108A will slide, with the minimum of friction, against the internal, cylindrical surface 124, which in practice results in deformation and minute leakage to the chamber 124B, although this leakage is on a microscale. This leakage is considerable when coupling the male part and female part together, since it causes a decrease in the residual pressure in the chamber 104 of the male part, which in turn reduces the resistance to coupling said parts together.

A small leakage also occurs at the sealing ring 108 when coupling said parts together, as the sealing ring slides along the cylindrical surface 100.

The fluid which leaks to the chamber 124B, however, passes through one or more channels 180 in the piston body 106A, to the forward end of the piston body lying in abutment with the piston body 138 of the female part. This part has provided in the centre thereof a central, axial channel 182 which discharges into the chamber 144 of the female part.

The outer end 184 of the channel 182 connects with the outer end of the channel 180. The channel 182 is thereafter provided with a check valve, which has the form of a ball valve 186 biased by a spring 188, such that flow can only occur in one direction, i.e. into the female part.

Fluid which leaks past the sealing ring 108 penetrates down between the piston bodies to the channel end 184.

Figure 11:
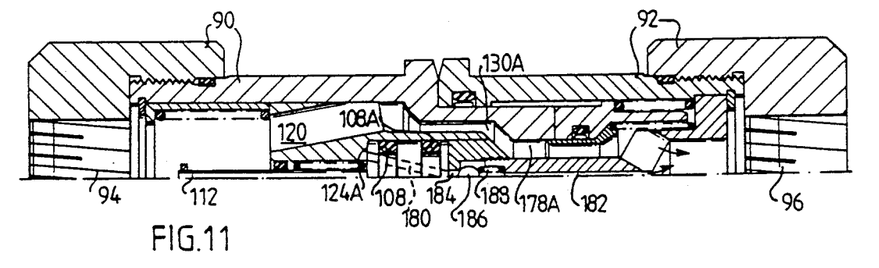
FIG. 11 illustrates the male part of FIG. 9 and the female part of FIG. 10 in their coupled state.

When coupling the male and female parts in the afore-described manner, the pressure in the chamber 144 of the female part will be considerably lower than the residual pressure in the chamber 104 of the male part. Because the residual pressure, which may at times be relatively high, is lowered during the coupling operation, as a result of conducting the fluid leakage to the chamber 124B via the channels 180, 182, the hydraulic pressure acting on the piston body 106A is reduced, such as to facilitate manual coupling of the male and female coupling-parts.

Figure 12:
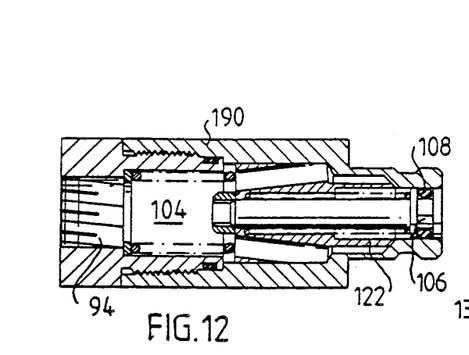
FIGS. 12 and 13 illustrate respectively a male coupling-part and a female coupling-part which correspond essentially with the male and female coupling-parts shown in FIG. 4 and FIG. 5 respectively, but with the difference that the female part is not provided with the inventive valve arrangement, since said female part is not connected to a high-pressure conduit. Furthermore, the male and female parts can be locked together with the aid of a conventional ball catch.
Figure 13:
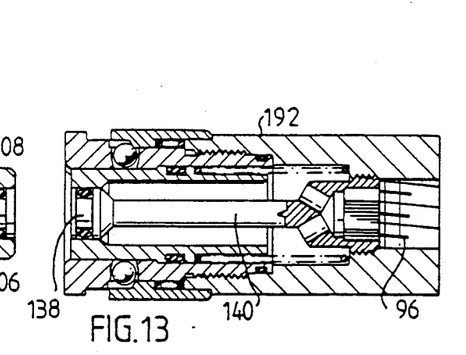
Figure 14:
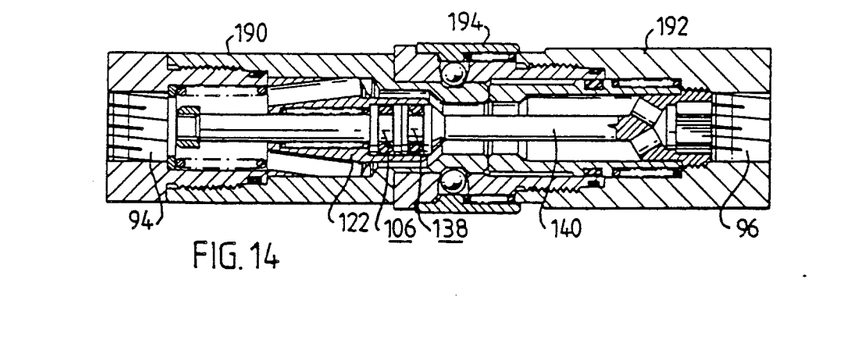
FIG. 14 illustrates the coupling parts of FIGS. 12 and 13 in their mutually coupled and locked position.

FIGS. 12 and 13 illustrate respectively a nipple or male part 190 and a coupling sleeve or female part 192, and FIG. 14 illustrates the male part and the female part in a mutually coupled state, in which the two parts are locked together by means of a ball catch 194.

The valve arrangement in the male part 190 is principally the same as that illustrated in FIG. 4, whereas the female part 192 lacks the provision of an inventive valve arrangement.

The piston body 106 of the male part, with sealing ring 108, coacts with the valve sleeve 122 in the same manner as that described with reference to FIG. 4.

For the purpose of facilitating manual coupling of the male part 190 with the female part 192, the coupling-parts can be provided with an arrangement similar to that illustrated in FIGS. 9 and 10, for the purpose of lowering the pressure in the chamber 104 while connecting said parts together. Prior to coupling said parts, a low pressure prevails in the chamber 96 of the female part.

We claim:

1. A valve arrangement for a pressure fluid, such as a pressure liquid, particularly high-pressure oil, comprising a valve housing (10, 90, 190) through which there extends a flow passage which is configured along part of its length with an internal, cylindrical sealing surface (16, 100, 160) which forms a guide for the outer, cylindrical sealing surface (42, 107, 162) of a piston body (18, 106, 138), and in which arrangement there is provided in one of these sealing surfaces a circular groove which accomodates a sealing ring (46, 64, 108, 164) made of a substantially elastic material, and in which the piston body is movable axially in relation to the other sealing surface, from a sealing starting position to an open position in which the piston body lies outside one end of said sealing surface and opens for through flow, characterized
in that an axially, displaceable valve sleeve (30, 70, 122, 156) is disposed coaxially with the two cylindrical sealing surfaces (16, 42, 100, 107, 162, 160) and has a cylindrical valve-sealing surface (40, 74, 124, 158) of essentially the same diameter as the two cylindrical sealing surfaces;
in that the valve sleeve is biased by a spring (34, 80, 118, 172) such that one end (36, 82, 126, 174) abuts substantially sealingly a seating (38, 86, 128, 176) at said end of said sealing surface such as to form a closed gap (41, 86, 130, 178);
in that said closed gap is situated at one end of a channel (32, 73, 132, 145), the other end of which is connected to a connection part (12, 14, 94, 96) with a pressure-fluid source;
in that the valve housing (10, 90, 190) is displaceable axially from a starting position relative to the piston body (18, 106, 138) to an intermediate position in which the sealing ring (46, 64, 108, 164) has been moved from a position on one side of the closed gap (41, 36, 130, 178) to a position on the other side of said closed gap, and in that continued displacement of the valve housing (10, 90, 190) relative to the piston body causes the valve sleeve to be moved relative to the seating so as to open the gap and form an open through-flow gap (41A, 86A, 130A, 148A) between the seating and the end of the valve sleeve while the sealing ring is protected by the valve sleeve at the same time.

2. An arrangement according to claim 1 in which the valve housing forms a nipple or male part (90, 190) which is intended to be inserted into a sleeve-like coupling part or female part (92, 192), the piston body (106, 106A) being movable axially from a forward end position in an internal, cylindrical end-part (100) of the passage, in which the piston body seals with a sealing ring (108, 108A), to a rear end position, in which the piston body has been moved outside the cylindrical end-part and is located in a widened part of the passage, the thus obtained gap between the forward end of the piston body and the cylindrical end-part opening the passage through said male part, characterized in that the axially movable valve sleeve (122) is disposed coaxially with the cylindrical end-part (100) and the forward end (126) of said valve sleeve is biased by a spring into substantially sealing abutment with a seating (128) located on the rear end of said cylindrical end-part, such as to form a closed gap (130) which closes the end of a channel (132) extending along the outside of the valve sleeve to a pressure-fluid chamber (104) in the valve housing; in that the inner surface of the valve sleeve forms an internal, cylindrical sealing surface (124) having the same radius as the external, cylindrical sealing surface (107) of the piston body (106); in that urging of the piston body to an intermediate position, said position being determined by engagement of the piston body with an abutment surface (124A) on the valve sleeve, is effected against the action of a compression spring (116) during movement of the sealing ring (108, 108A) on the piston body from a position on one side of the closed gap to a position on the other side of the closed gap; and in that continued movement of the piston body towards said end position is operative to cause the piston body to entrain the valve sleeve and therewith open the closed gap to permit pressure fluid to flow through the valve arrangement.

3. An arrangement according to claim 1, in which the valve housing forms a sleeve-like coupling part or female part (92) for receiving a nipple or male part (90) by virtue of the fact that the end of the nipple forms a cylinder which can be pressed against a sealing sleeve (148) mounted for axial movement in the female part and surrounding the piston body (138) held axially in the valve housing, such that the end-cylinder (134) of the male part is displaced inwards and over the piston body when coupling said parts together and forces back the sealing sleeve until the two mutually opposing piston bodies are located at a distance from the inner end of the internal, cylindrical part of the sealing sleeve such as to open the through-flow passage, characterized in that an axially displaceable valve sleeve (156) is displaced coaxially with the piston body (138) of the female part and abuts substantially sealingly at its forward end with a seating (176) provided on the rear end of the piston body, such as to form a closed gap (174) at the end of a channel (145) which is connected with a connection (96) to a pressure-fluid source, the outer, cylindrical sealing surface (158) of the valve sleeve having the same diameter as the outer, cylindrical sealing surface (160) of the piston body (138); in that the internal, cylindrical sealing surface (136) of the sealing sleeve is provided with a circular groove which accomodates the elastic sealing ring, in axially displacing the sealing sleeve in the valve housing to an intermediate position located between a starting position and an inner, said ring end position is moved from one side of the closed gap (178) to a position on the other side of said gap; in that in said intermediate position the sealing sleeve is in abutment with a part (154) of the valve sleeve (156) such that continued inward movement of the sealing sleeve (148) from said intermediate position to the inward, end position will cause the sealing sleeve to displace the valve sleeve (156) axially and therewith open the closed gap (178) to an open gap (178A) for through-flow of the pressure fluid.

4. An arrangement according to claim 2, characterized in that the piston body (106A) of the male part (90) has two axially separated sealing rings (108, 108A) each of which is located on a respective side of the closed gap (130) in the starting position of the piston body; in that the cylindrical chamber (124B) receiving the piston body is connected with the centre of the outer end of the piston body by means of at least one through-passing channel (180) in the piston body; in that the piston body (138) of the female part (92) has a central, through-passing channel (184, 182) which is provided with a check valve (186) and opens into the pressure chamber (144) of the female part, such that the channel (102) in the female part will receive leakage oil which, when pressing-in the piston body (106A) of the male part, leaks past the one sealing ring (108A) and into the cylindrical chamber (124B) of the male part, thereby lowering the pressure in the pressure chamber (104) of the said male part.

* * * * *